United States Patent
Bharatia et al.

(10) Patent No.: US 7,382,748 B1
(45) Date of Patent: Jun. 3, 2008

(54) ASSIGNING A DYNAMIC HOME AGENT FOR A MOBILE NETWORK ELEMENT

(75) Inventors: Jayshree Bharatia, Plano, TX (US); Kuntal Chowdhury, Plano, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1155 days.

(21) Appl. No.: 10/102,171

(22) Filed: Mar. 20, 2002

Related U.S. Application Data

(60) Provisional application No. 60/336,121, filed on Oct. 24, 2001.

(51) Int. Cl.
*H04Q 7/20* (2006.01)
*H04Q 7/00* (2006.01)

(52) U.S. Cl. ............ 370/331; 370/328; 370/352; 370/401; 455/412.2; 455/433

(58) Field of Classification Search ........ 370/312–331, 370/338, 342, 351, 352, 395.5, 395.52, 401; 455/422.1–466, 412.1–414.4
See application file for complete search history.

(56) References Cited

U.S. PATENT DOCUMENTS

| | | | | |
|---|---|---|---|---|
| 6,407,988 B1 * | 6/2002 | Agraharam et al. | ........ | 370/328 |
| 6,466,964 B1 * | 10/2002 | Leung et al. | ........ | 709/202 |
| 6,560,217 B1 * | 5/2003 | Peirce et al. | ........ | 370/351 |
| 6,738,362 B1 * | 5/2004 | Xu et al. | ........ | 370/329 |
| 6,760,444 B1 * | 7/2004 | Leung | ........ | 380/270 |
| 6,816,912 B1 * | 11/2004 | Borella et al. | ........ | 709/238 |
| 6,915,345 B1 * | 7/2005 | Tummala et al. | ........ | 709/225 |
| 6,970,443 B2 * | 11/2005 | Dynarski et al. | ........ | 370/338 |
| 6,973,057 B1 * | 12/2005 | Forslow | ........ | 370/328 |
| 6,978,128 B1 * | 12/2005 | Raman et al. | ........ | 455/414.1 |
| 7,174,018 B1 * | 2/2007 | Patil et al. | ........ | 380/258 |
| 2001/0016492 A1 * | 8/2001 | Igarashi et al. | ........ | 455/433 |
| 2001/0036164 A1 * | 11/2001 | Kakemizu et al. | ........ | 370/331 |
| 2001/0053694 A1 * | 12/2001 | Igarashi et al. | ........ | 455/433 |
| 2002/0012433 A1 * | 1/2002 | Haverinen et al. | ........ | 380/247 |
| 2002/0026527 A1 * | 2/2002 | Das et al. | ........ | 709/245 |
| 2002/0065785 A1 * | 5/2002 | Tsuda | ........ | 705/67 |
| 2002/0068565 A1 * | 6/2002 | Purnadi et al. | ........ | 455/436 |
| 2002/0069287 A1 * | 6/2002 | Sakata | ........ | 709/230 |
| 2002/0145993 A1 * | 10/2002 | Chowdhury et al. | ........ | 370/338 |

(Continued)

OTHER PUBLICATIONS

Pat R. Calhoun et al., AAA Working Group, Internet-Draft, "Diameter Mobile IPv4 Application," pp. 1-45 (Mar. 2002).

(Continued)

*Primary Examiner*—Edan Orgad
*Assistant Examiner*—Venkatesh Haliyur
(74) *Attorney, Agent, or Firm*—Trop, Pruner & Hu, P.C.

(57) ABSTRACT

To dynamically assign a home agent to a mobile node, a foreign server (e.g., foreign Authentication, Authorization, and Accounting or AAA server) in the visited network sends a first request to a home server (e.g., a home AAA server) to check local policy regarding assigning the home agent in the visited network. The home server responds with an answer. In response to the answer the foreign server sends a home agent request to a node in the visited network to indicate that the node is to be assigned the home agent.

20 Claims, 3 Drawing Sheets

U.S. PATENT DOCUMENTS

2002/0188562 A1* 12/2002 Igarashi et al. ............... 705/40
2005/0079869 A1* 4/2005 Khalil et al. ............. 455/435.1

OTHER PUBLICATIONS

T. Hiller et al., Network Working Group, Request for Comments: 3141, "CDMA Wireless Data Requirements for AAA," pp. 1-15 (Jun. 2001).

P. Calhoun et al., Network Working Group, Request for Comments: 2794, "Mobile IP Network Access Identifier Extension for IPv4," pp. 1-8 (Mar. 2000).

David B. Johnson et al., IETF Mobile IP Working Group, Internet-Draft, "MobilitySupport in IPv6 <draft-ietf-mobileip-ipv6-15.txt>," pp. 1-123 (Jul. 2001).

C. Perkins, Network Working Group Request for Comments: 3220, "IP Mobility Support for IPv4," pp. 1-92 (Jan. 2002).

C. Perkins, Internet Engineering Task Force, "IP Mobility Support for IPv4, revised draft-ietf-mobileip-rfc2002-bis-08.txt," pp. 1-96 (Sep. 2001).

Jayshree Bharatia, et al., AAA Working Group, Internet-Draft, "Optimized Dynamic Agent Assignment Using Diameter," pp. 1-6 (Nov. 2001).

S. Glass et al., Network Working Group, Request for Comments: 2977, Mobile IP Authentication Authorization, and Accounting Requirements, pp. 1-27 (Oct. 2000).

Pat R. Calhoun et al., AAA Working Group, Internet-Draft, "Diameter Base Protocol," pp. 1-123 (Nov. 2001).

* cited by examiner

ASSIGNING A DYNAMIC HOME AGENT FOR A MOBILE NETWORK ELEMENT

CROSS REFERENCE TO RELATED APPLICATION

This claims the benefit under 35 U.S.C. § 119(e) of U.S. Provisional Application Ser. No. 60/336,121, entitled "Optimized Home Agent Assignment," filed Oct. 24, 2001.

TECHNICAL FIELD

This invention relates generally to assigning home agents for mobile network elements.

BACKGROUND

Packet-based data networks are widely used to link various types of network elements, such a personal computers, network telephones, Internet appliances, personal digital assistants (PDAs), mobile telephones, and so forth. Many types of communications are possible over packet-based data networks, including electronic mail, web browsing, file downloads, electronic commerce transactions, voice or other forms of real-time, interactive communications, and so forth.

One type of a packet-based network is an Internet Protocol (IP)-based network. Communications over a packet-based network is performed using packets or datagrams that are typically sent in bursts from a source to one or more destination points. A network element is typically assigned a network address (e.g., an IP address). A packet sent across a data network includes a source network address (of the transmitting network element) and a destination network address (of the destination network element). Routers in the data network route each packet over network paths based on the source and destination addresses. Such communications over packet-based networks are referred to as packet-switched communications.

Mobility of network elements (such as notebook computers or PDAs) is a desired feature. As a user travels between different points, the point of attachment of the network element associated with the user may change. The user can potentially move from his or her home network (first point of attachment) to another network, referred to a visited or foreign network (second point of attachment). The point of attachment of a mobile network element to a network can either be a wired attachment or wireless attachment. An example of a wired attachment is using a network cable to connect the mobile network element to a port in a wall outlet that connects to a network. An example of a wireless point of attachment is a wireless link between a mobile station and a base station of a mobile communications network (such as a cellular communications network). In the latter case, the mobile station can be a mobile telephone or any other portable device that is capable of communicating wireless signaling with base stations associated with the mobile communications network.

To provide enhanced flexibility and convenience in allowing a user to change points of attachment across different networks, the Mobile IP protocol has been defined. The Mobile IP protocol defines a home agent, which is a router in the home network of a mobile network element that is responsible for tunneling packets for delivery to the mobile network element when it is away from the home network. The home agent maintains the current location information for the mobile network element. The Mobile IP protocol also defines a foreign agent, which is a router in the visited or foreign network that the mobile network element is currently attached to. The foreign agent provides routing services to the mobile network element, and detunnels and delivers packets to the mobile network element that were tunneled by the mobile network element's home agent.

For increased flexibility, the home agent is not necessarily limited to a static home agent located in the home network of a mobile network element. In some cases, dynamic home agent allocation can be performed by a home or foreign network. However, existing proposals for dynamically assigning a home agent in a home or foreign network are relatively inefficient.

SUMMARY

In general, an efficient method and apparatus is provided for dynamically allocating a home agent in a home or foreign network for a mobile network element. For example, a method of assigning a home agent to a mobile network element while the mobile network element is in a visited network includes exchanging messages between a foreign server in the visited network and a home server associated with the home network of the mobile network element. A node in the visited network is assigned as the home agent for the mobile network element. In some embodiments of the invention, the number of messages exchanged between the foreign server and home server is reduced to improve enhanced efficiency.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
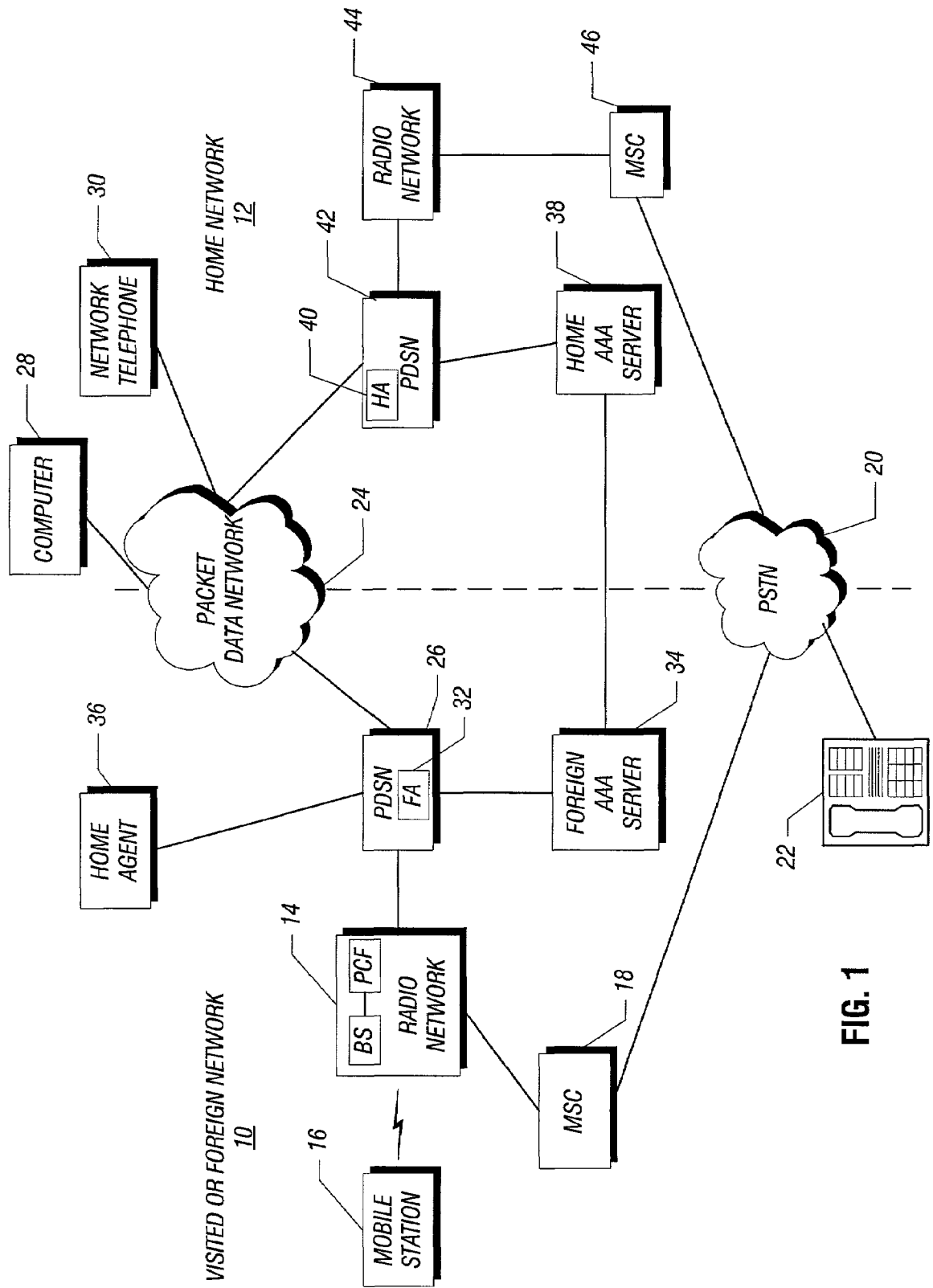
FIG. 1 is a block diagram of an example arrangement of a mobile communications network having a home network and a visited or foreign network, from the perspective of a given mobile node.

FIG. 1 illustrates an example arrangement of a wireless mobile communications network that includes a first wireless network 10 and a second wireless network 12. Each wireless network includes an arrangement of cells, with each cell having a radio base station to communicate radio frequency (RF) signals with mobile stations (e.g., mobile telephones). The two wireless networks may be associated with different service providers.

Note that the arrangement shown in FIG. 1 is an example of a mobile or wireless communications network that is implemented according to the code-division multiple access (CDMA) 2000 family of standards (also referred to as IS-2000). The IS-2000 Standard is developed by the Third Generation Partnership Project 2 (3GPP2). A CDMA 2000 wireless network is capable of supporting both circuit-switched services and packet-switched services.

Other types of mobile communications networks can be employed in other embodiments, such as those networks based on time-division multiple access (TDMA) protocols. One example of a TDMA protocol that supports packet-switched services is the Enhanced General Packet Radio Service (EGPRS) protocol, as defined by the 3GPP (Third Generation Partnership Project) UMTS (Universal Mobile Telecommunications System) Release 1999 Standard. The wireless protocols that support packet-switched services referred to here are provided as examples only, as other protocols can be used in other embodiments.

Mobility can also be provided in a wired communications network arrangement, in which mobile network elements are attached to a network by a wired connection. A wired connection is usually in the form of a direct cable connection between the mobile network element and the respective network. Alternatively, a wired connection arrangement can also include a wireless local area network (LAN), in which the mobile network element communicates wirelessly with base stations that are in close proximity to the mobile network element, with the base stations being wired to the network. The concepts described for dynamically assigning a home agent in a visited or foreign network are applicable to either a wireless mobile communications network arrangement (such as CDMA or TDMA network arrangement) or to a wired network arrangement.

As shown in FIG. 1, from the perspective of a given mobile station 16, the mobile communications network includes a home network 12 and a visited or foreign network 10. The mobile station 16 is associated with a subscriber of the service provider that supports the home network 12. However, the mobile station 16 can travel to a location that is covered by the visited wireless network 10. From the perspective of other mobile stations, the network 10 is the home network while the network 12 is potentially a visited or foreign network.

FIG. 1 shows that the mobile station 16 has traveled outside the coverage area of the home wireless network 12 and into the foreign wireless network 10. The foreign wireless network 10 includes a radio network 14, which includes plural base stations that control radio communications in respective cells or cell sectors. Once attached to the foreign wireless network 10, the mobile station 16 is able to communicate control signaling and traffic over radio frequency (RF) signals or other wireless signals with the radio network 14.

Seamless mobility between networks in a packet-switched environment, such as an Internet Protocol (IP) environment, is defined by Mobile IP. A version of Mobile IP is described in RFC 3220, entitled "IP Mobility Support for IPv4," dated January 2002. Another version of Mobile IP is described in Internet Engineering Task Force (IETF) Internet Draft, entitled "IP Mobility Support in IPv6, Draft-IETF-Mobileip-IPv6-15.txt," dated July 2001. One version of IP is IPv4, described in RFC 791, entitled "Internet Protocol," dated September 1981; while another version of IP is IPv6, described in RFC 2460, entitled "Internet Protocol, Version 6 (IPv6) Specification," dated December 1998. In packet-switched communications, packets or other units of data carry routing information (in the form of network addresses) that are used to route the packets or data units over one or more paths to a destination endpoint. However, note that embodiments of the invention can be applied in networks using other packet-switched protocols and mobility protocols.

For communicating circuit-switched voice or other traffic, the radio network 14 is coupled to a mobile switching center (MSC) 18, which is responsible for switching mobile station-originated or mobile station-terminated traffic. Effectively, the MSC 18 is the interface for signaling end user traffic between the wireless network 10 and public switched networks, such as a public switched telephone network (PSTN) 20, or other MSCs. The PSTN 20 is connected to landline terminals, such as telephones 22.

The wireless network 10 is also capable of supporting packet-switched data services, in which packet data is communicated between the mobile station 16 and another endpoint, which can be a terminal coupled to a packet-based data network 24 or another mobile station that is capable of communicating packet data. Examples of the packet-based data network 24 include private networks (such as local area networks or wide area networks) and public networks (such as the Internet). Packet data is communicated in a packet-switched communications session established between the mobile station and the other endpoint.

To communicate packet data, the radio network 14 includes a packet control function (PCF) module, which manages the relay of packets between the base stations and a packet data serving node (PDSN) 26. PCF and PDSN are entities defined by the IS-2001 (IOS) Standard. With other types of wireless protocols, other types of entities are involved in communicating mobile station-originated or mobile station-terminated packet data. More generally, a node (such as the PDSN 26) in the wireless network that manages the communication of packet-data is referred to as a "packet service node."

The PDSN 26 establishes, maintains, and terminates link layer sessions to mobile stations, and routes mobile station-originated or mobile station-terminated packet data traffic. The PDSN 26 is coupled to the packet-based data network 24, which is connected to various endpoints, such as a computer 28 or a network telephone 30. Examples of packet-switched communications include web browsing, electronic mail, text chat sessions, file transfers, interactive game sessions, voice-over-IP (Internet Protocol) sessions, and so forth. In one embodiment, packet-switched communications utilize a connectionless internetwork layer defined by IP.

To enable the mobile station 16 to change its point of attachment between the home wireless network 12 and foreign wireless network 10 without service disruption, Mobile IP is implemented in the mobile communications network. When the mobile station 16 first enters the foreign wireless network 10, it sends a registration request to a foreign agent (FA) 32. The foreign agent 32 is a router on the foreign network that provides routing services to the mobile station while the mobile station is registered. The foreign agent 32 detunnels and delivers packets to the mobile station that were tunneled by the home agent of the mobile station to the foreign agent. In the example arrangement of FIG. 1, the foreign agent 32 is part of the PDSN 26.

A foreign AAA (Authentication, Authorization, and Accounting) server 34 is also present in the foreign wireless network 10 to provide authentication and authorization services for a mobile station that is attempting to connect to the foreign wireless network 10. The authentication and authorization services performed by the foreign AAA server 34 are based on a network access identifier (NAI) of the mobile station 16. An example NAI is user1@nortelnetworks.com. In some embodiments, using the NAI of the mobile node to perform AAA services is described in RFC 2794, entitled "Mobile IP Network Access Identifier Extension for IPv4," dated March 2000.

The foreign AAA server 34 interacts with the foreign agent 32 and other AAA servers (such as home AAA server 38 in the home wireless network 12) to provide the authorization and authentication services. The foreign AAA server 34 also provides a mechanism to support security association between the mobile station 16 and the foreign agent 32 and between the foreign agent 32 and a home agent. The home agent is dynamically assigned by the foreign AAA server 34, in accordance with a procedure according to some embodiments of the invention (discussed further below).

As used here, a "home agent" is a node that directs packets to the mobile node (e.g., wireless mobile station or wired node) while the mobile node is attached to a foreign network and away from the home network. Packets sent to the home address of the mobile node are intercepted by its home agent. The packets are sent by the home agent through a tunnel to a care-of address of the mobile node. The care-of address specifies the end of the tunnel, which can be a foreign agent or the mobile node itself. The packets are then forwarded on to the mobile node.

Mobile IP AAA is described in RFC 2977, entitled "Mobile IP Authentication, Authorization, and Accounting Requirements," dated October 2000. CDMA 2000 requirements for AAA are described in RFC 3141, entitled "CDMA2000 Wireless Data Requirements for AAA," dated June 2001. Although some embodiments employ entities (AAA servers 34 and 38) that are compliant with the Mobile IP AAA requirements, other embodiments can employ other types of entities for authenticating a visiting mobile node in a foreign network. Thus, instead of the foreign AAA server 34 performing dynamic home agent assignments in the foreign network 12, another type of entity (referred to generally as a "foreign server") in the foreign network 10 can perform the dynamic home agent assignments.

The dynamically assigned home agent for the visiting mobile station 16 can be a node (e.g., home agent 36) located in the foreign network 10. Assuming that a policy specified by the home AAA server 38 allows dynamic allocation of the home agent in a foreign network, the foreign AAA server 34 assigns the home agent on behalf of the mobile station 16. If the policy specified in the home AAA server 38 for the mobile station 16 does not allow for such dynamic allocation of a home agent in a foreign network, then the home AAA server 36 assigns a home agent in the home network 12. For example, a home agent 40 in a PDSN 42 of the home network 12 can be assigned for the mobile station 16.

The home network 12 similarly also includes a radio network 44 that provides an air interface to mobile stations (not shown). The radio network 44 is coupled to the PDSN 42 for packet-switched communications and a MSC 46 for circuit-switched communications. The PDSN 42 is coupled to the packet-based data network 24, and the MSC 46 is coupled to the PSTN 20.

Other wireless technologies to which embodiments of the invention can be applied include IEEE 802.11a, Wideband CDMA (WCDMA), General Packet Radio Service (GPRS), Global System for Mobile (GSM), and so forth. As noted above, the concept of mobility can also be applied to wired networks instead of wireless networks. In the wired context, the home network 12 represents one domain while the foreign network 10 represents another domain. Instead of radio networks, mobile nodes access each network through a wired connection.

Figure 2:
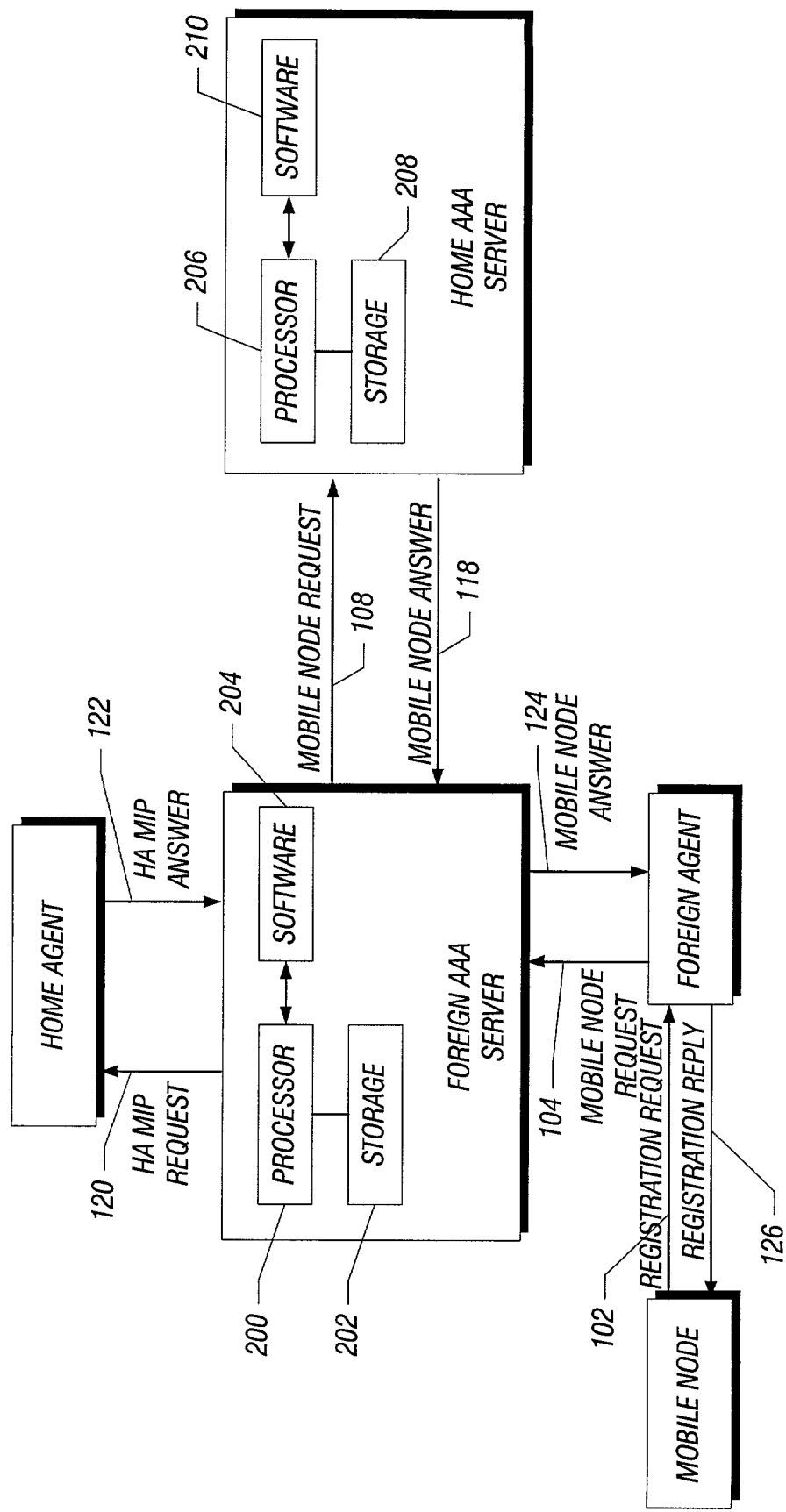
FIG. 2 illustrates entities involved in dynamically assigning a home agent to a mobile node in the visited or foreign network of FIG. 1.
Figure 3:
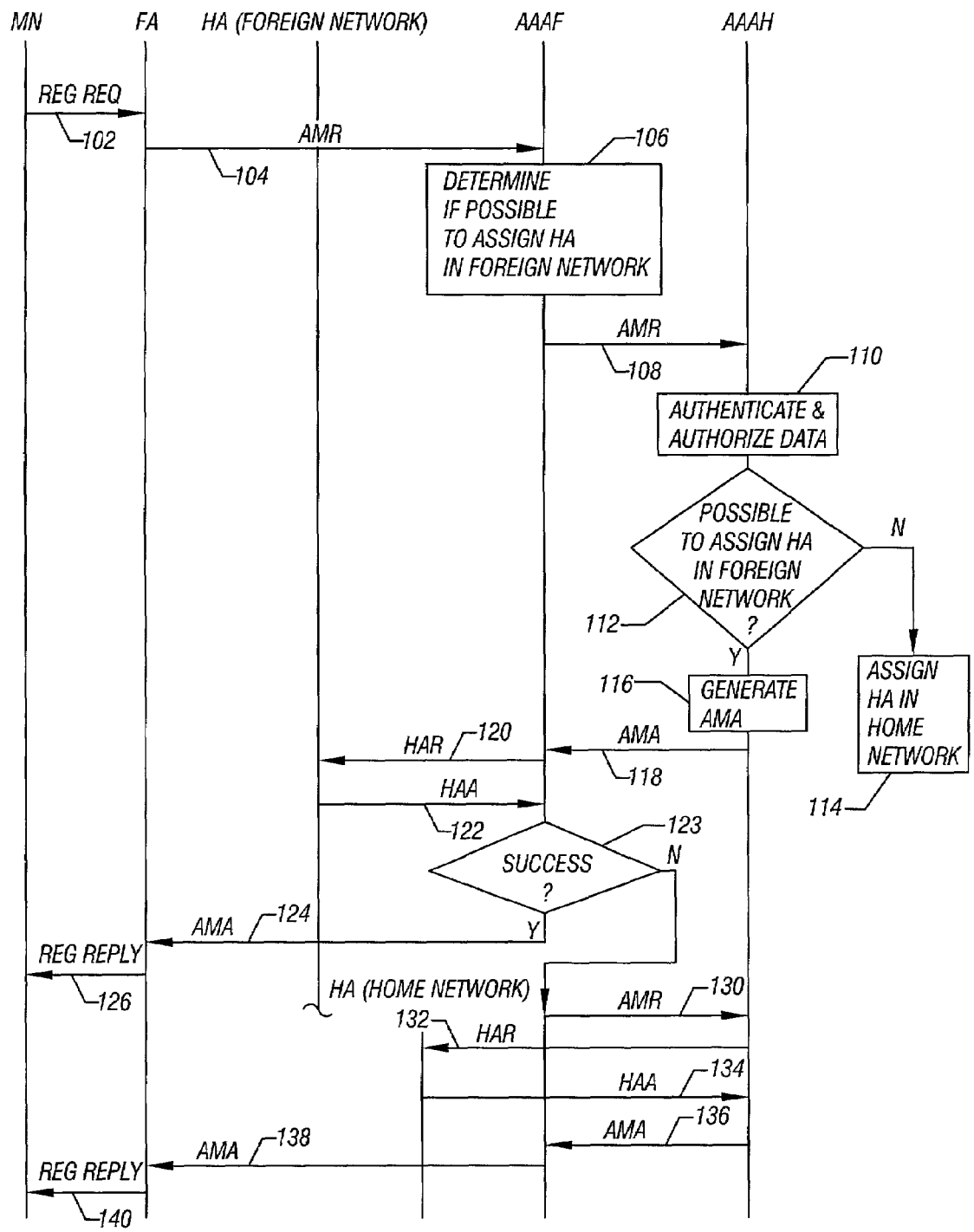
FIG. 3 is a message flow diagram of a process of assigning the home agent, in accordance with an embodiment.

In the ensuing discussion, reference is made generally to a "mobile node" to indicate that the mobile node can be a wireless or wired node. FIGS. 2 and 3 show a procedure for registering a mobile node in a foreign network and dynamically assigning a home agent to the mobile node. In the context of the mobile communications network of FIG. 1, the mobile node of FIG. 2 is the mobile station 16, the foreign network is the foreign wireless network 10, and the home network is the home wireless network 12. However, the mobile node, home network, and foreign network can also be part of a wired network arrangement.

When the mobile node first enters the foreign network, it sends (at 102) a Mobile IP Registration Request (RRQ) to the foreign agent 32. Registration creates or modifies a mobility binding for the mobile node. It is also through the registration procedure that the mobile node is able to discover the address of a home agent. A registration procedure involves the exchange of a Registration Request message and a Registration Reply message. The Registration Request contains the following fields: a source IP address (the address of the mobile node); a destination IP address (the address of the foreign agent); a Lifetime field (to indicate an amount of time remaining before the registration is considered expired); a Home Address field (to contain the IP address of the mobile node, which may not be known by the mobile node at this point); a Home Agent field (to contain the IP address of the home agent of the mobile node, which may not be known by the mobile node at this point); a Care-of Address field (to contain the IP address for the end of the tunnel from the home agent); and other fields as described in RFC 3220.

The Home Agent field of the registration request is set to a predefined invalid value to indicate that discovery of a home agent is desired. The Home Agent field is set to a first predefined value to indicate that allocation of the home agent in the foreign network is desired. The Home Agent field is set to a second predefined value to indicate allocation of the home agent in the home network is desired. In one example, the second predefined value is 0.0.0.0, and the first predefined value is 255.255.255.255.

In accordance with some embodiments of the invention, the Home Agent field in the Registration Request is transparent to the foreign agent. In other words, processing based on the Home Agent field in the Registration Request is not performed in the foreign agent. The foreign agent converts the registration request into an AA-Mobile-Node-Request (AMR), which is sent (at 104) by the foreign agent to the foreign AAA server. The AA-Mobile-Node-Request message contains various information extracted from the Registration Request sent by the mobile node.

In one embodiment, the AA-Mobile-Node-Request is based on the Diameter Base Protocol, as described in AAA Working Group Internet-Draft, entitled "Diameter Base Protocol," dated November 2001. The format of the AA-Mobile-Node-Request is further described in AAA Working Group Internet-Draft, entitled "Diameter Mobile IPv4 Application," dated November 2001. However, the specific format of the message exchanged between the foreign agent and the foreign AAA server is not important. Various types of messages can be exchanged between the foreign agent and the foreign AAA server to indicate predetermined types of operations, including registration operations, authentication and authorizations operations, and home agent assignment operations.

Among other information, the AA-Mobile-Node-Request includes an MIP-Mobile-Node-Address field, an MIP-Home-Agent-Address field, and an MIP-Feature-Vector field. Such fields are also referred to as attribute value pairs (AVPs). In accordance with some embodiments of the invention, the Home Agent field contained in the Registration Request sent from the mobile node at 102 is constructed in the MIP-Home-Agent-Address field of the AA-Mobile-Node-Request. However, unlike conventional solutions, the MIP Feature-Vector field in the AA-Mobile-Node-Request is not constructed based on the Home Agent field contained in the Registration Request. As a result, less processing of the Registration Request in the foreign agent is required, which simplifies the design of the foreign agent and speeds up processing of the Registration Request from the mobile node.

However, in other embodiments, the MIP-Feature-Vector field can be constructed based on the Home Agent field contained in the Registration Request.

Upon receipt of the AA-Mobile-Node-Request, the foreign AAA server checks (at 106) then the foreign AAA server adds an MIP-Feature-Vector AVP to the AA-Mobile-Node-Request. The MIP-Feature-Vector AVP contains a Foreign-Home-Agent-Available flag, which is set to the logical state "1" to indicate that the foreign AAA server is able to assign a home agent in the foreign network. The updated AA-Mobile-Node-Request (AMR) is sent (at 108) from the foreign AAA server to the home AAA server.

When the home AAA server receives the AA-Mobile-Node-Request, the home AAA server authenticates and authorizes (at 110) (FIG. 3) the data received in the AA-Mobile-Node-Request. The home AAA server then determines (at 112), based on local policy, if it is possible to have a home agent assigned in a foreign network. If not, then the home AAA server proceeds to assign a home agent in the home network (at 114). An example of assigning the home agent in the home network is discussed in the Internet-Draft entitled "Diameter Mobile IPv4 Application," referred to above.

If the home AAA server determines (at 112) that it is possible to have a home agent in the foreign network, then the home AAA server generates (at 116) an AA-Mobile-Node-Answer (AMA) with a Result-Code AVP set to a DIAMETER_LIMITED_SUCCESS value (or some other predefined value). The AA-Mobile-Node-Answer is sent (at 118) from the home AAA server to the foreign AAA server. The DIAMETER_LIMITED_SUCCESS value of the Result-Code AVP indicates to the foreign AAA server that the foreign AAA server is to assign a home agent in the foreign network. Other possible values of the Result-Code AVP include DIAMETER_SUCCESS (to indicate that a home agent has been successfully assigned); DIAMETER_ERROR_HA_NOT_AVAILABLE (to indicate that the requested home agent cannot be assigned to the mobile node); and other values to indicate other states.

In response to the Result-Code AVP containing the DIAMETER_LIMITED_SUCCESS value, the foreign AAA server 106 sends (at 120) a Home Agent MIP Request (HAR) to a dynamically assigned home agent in the foreign network. Note that the Home Agent MIP Request is originated by the foreign AAA server, not by the home AAA server. As a result, an explicit Home Agent MIP Request and the associated Home Agent MIP Answer messages do not need to be exchanged between the foreign AAA server and the home AAA server, thereby reducing the number of messages that have to be communicated between the AAA servers and the processing time involved.

In response to the Home Agent MIP Request Message, the home agent provides its address in an MIP-Home-Agent-Address field of a Home Agent MIP Answer (HAA) message. If the mobile node did not provide its address in the Registration Request (e.g., the mobile node address was set to 0.0.0.0), then the dynamically assigned home agent also assigns the mobile node address in an MIP-Mobile-Node-Address field in the Home Agent MIP Answer. The Home Agent MIP Answer is sent (at 122) from the home agent to the foreign AAA server. In response, the foreign AAA server determines (at 123) if the home agent was successfully assigned, based on the Result-Code field in the Home Agent MIP Answer. If successful, the foreign AAA server sends (at 124) an AA-Mobile-Node-Answer (AMA) to the foreign agent. The MIP-Mobile-Node-Address field and the MIP-Home-Agent-Address field in the AA-Mobile-Node-Answer are assigned the values contained in corresponding fields in the Home Agent MIP Answer sent at 122.

The foreign agent 32 then sends (at 126) a Registration Reply (RRP) message to the mobile node 16. The Registration Reply message contains the following fields: a source IP address (the address of the foreign agent); a destination IP address (the address of the mobile node); a Lifetime field; a Home Address field (which contains the address of the mobile node); a Home Agent field (which contains the address of the home agent that has been dynamically assigned in the foreign network by the foreign AAA server); and other fields. At this point, the mobile node has been successfully registered, authenticated and authorized, and assigned a home agent. As a result, communications between the mobile node and another node coupled to the packet-based network 24 can proceed.

If the assignment of the home agent fails in the foreign network after receiving the AA-Mobile-Node-Answer (at 118) from the home AAA server, as determined at 123, the foreign AAA server sends (at 130) another Mobile Node Request (AMR) to the home AAA server. The foreign AAA server adds the MIP-Feature-Vector AVP to the AA-Mobile-Node-Request with the Home-Agent-Assignment-in-Foreign-Network-Failed flag set to logic state "1." Upon receipt of the AA-Mobile-Node-Request with the indication of failure, the home AAA server assigns a home agent in the home network if permitted by local policy. In assigning the home agent in the home network, the home AAA server sends (at 132) a Home Agent MIP Request (HAR) to the home agent in the home network. The home network home agent responds (at 134) with a Home Agent MIP Answer (HAA) back to the home AAA server. The home AAA server then sends (at 136) an AA-Mobile-Node-Answer to the foreign AAA server, which forwards the AA-Mobile-Node-Answer (at 138) to the foreign agent. The foreign agent then sends (at 140) a Registration Reply to the mobile node to indicate the address of the assigned the home agent in the home network.

If the local policy does not permit assignment of a home agent in the home network, then the home AAA server sends an AA-Mobile-Node-Answer to the foreign AAA server with the Result-AVP flag set to the error value DIAMETER-ERROR-HA-NOT-AVAILABLE. The dynamic home agent assignment failure is subsequently communicated to the mobile node in a Registration Reply message.

The acts performed by the various entities in dynamically assigning a home agent are controlled by software (e.g., software 204 in the foreign AAA server and software 210 in the home AAA server, shown in FIG. 2) loaded in the respective entities. Instructions of the software are loaded for execution on corresponding control units or processors (e.g., 200 in foreign AAA server and 206 in home AAA server) in each entity. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices (e.g., storage 202 in the foreign AAA server and storage 208 in the home AAA server), which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software are loaded or transported to each entity in one of many different ways. For example, code segments including instructions stored on floppy disks, CD or DVD media, a hard disk, or transported through a network interface card, modem, or other interface device are loaded into the entity and executed as corresponding software routines or modules. In the loading or transport process, data signals that are embodied in carrier waves (transmitted over telephone lines, network lines, wireless links, cables, and the like) communicate the code segments, including instructions, to the entity. Such carrier waves are in the form of electrical, optical, acoustical, electromagnetic, or other types of signals.

While the invention has been disclosed with respect to a limited number of embodiments, those skilled in the art will appreciate numerous modifications and variations there from. It is intended that the appended claims cover such modifications and variations as fall within the true spirit and scope of the invention.

What is claimed is:

1. A method of assigning a home agent to a mobile network element while the mobile network element is in a visited network, comprising:
   receiving, at a foreign server in the visited network, a first message from a home server associated with a home network of the mobile network element,
   the first message containing an indication that assignment of a home agent is to be performed by the foreign server for the mobile network element;
   sending, from the foreign server, a second message to a node coupled to the visited network in response to receiving the first message, the second message being of a type different from the first message and containing a request that the node is to be assigned as the home agent for the mobile network element;
   receiving, at the foreign server, a third message containing an indication that assignment of a home agent in the visited network is to be performed, the third message containing information contained in a registration request message originated by the mobile network element to register on the visited network; and
   setting, in the foreign server, a field in the third message to indicate that the home agent can be assigned in the visited network; and sending the third message with the field set to the home server.

2. The method of claim 1, wherein receiving the first message comprises receiving an answer message to the third message.

3. The method of claim 2, wherein sending the third message from the foreign server to the home server comprises sending an M-Mobile-Node-Request message according to a Diameter Base Protocol.

4. The method of claim 3, wherein receiving the answer message comprises receiving an AA-Mobile-Node-Answer message according to the Diameter Base Protocol.

5. The method of claim 4, wherein sending, from the foreign server, the second message comprises sending a Home Agent Request message according to the Diameter Base Protocol.

6. The method of claim 1, further comprising the home server determining if a policy permits assigning the home agent in the visited network.

7. The method of claim 1, further comprising:
   receiving the registration request message from the mobile network element at a packet service node,
   wherein the mobile network element is a wireless mobile station.

8. The method of claim 1, further comprising receiving the third message from a packet service node,
   wherein the packet service node is a code-division multiple access (CDMA) packet data serving node (PDSN).

9. A method of assigning a home agent to a mobile network element while the mobile network element is in a visited network, comprising:
   receiving, at a foreign server in the visited network, a first message from a home server associated with a home network of the mobile network element,
   the first message containing an indication that assignment of a home agent is to be performed for the mobile network element;
   sending, from the foreign server, a second message to a node coupled to the visited network in response to receiving the first message,
   the second message being of a type different from the first message and containing a request that the node is to be assigned as the home agent for the mobile network element;
   receiving, at the foreign server, a third message containing an indication that assignment of a home agent in the visited network is to be performed, the third message containing information contained in a registration request message originated by the mobile node to register on the visited network; and
   sending a fourth message to the home server if assignment of the home agent in the visited network fails, the fourth message indicating that assignment of the home agent in the visited network has failed.

10. The method of claim 9, further comprising the home server assigning the home agent in the home network in response to the fourth message.

11. The method of claim 1, wherein receiving the first message at the foreign server from the home server comprises receiving the first message at a foreign Authentication, Authorization, and Accounting (AAA) server from a home AAA server.

12. The method of claim 1, further comprising assigning the node as the home agent according to a Mobile Internet Protocol.

13. An article comprising at least one computer-readable storage medium, wherein computer-executable instructions encoded in the at least one computer-readable storage medium are for assigning a home agent to a mobile node while the mobile node is in a visited network, the instructions when executed causing a system to:

generate a first request to send from a foreign server associated with the visited network to a home server associated with a home network of the mobile node;

receive an answer to the first request originated by the home server, the answer containing a value set by the home server to indicate assignment of the home agent in the foreign network is enabled;

generate a second request in response to the answer;

send the second request from the foreign server to a node in the foreign network, the second request to indicate that the node is to be assigned the home agent for the mobile node;

receive a message containing an indication that requests assignment of a home agent in the visited network, wherein the indication is a home agent address field in the message having a predefined invalid value; and construct a field to include in the first request in response to the indication.

14. The article of claim 13, wherein the instructions when executed cause the system to receive a second answer from the node, the second answer containing a field containing a network address of the node as the home agent for the mobile node.

15. The article of claim 14, wherein the instructions when executed cause the system to generate a third answer to send from the foreign server to a foreign agent, the third answer containing a Home Agent field containing the network address of the node.

16. The article of claim 13, wherein the first request comprises an AA-Mobile-Node-Request, the answer comprises an AA-Mobile-Node-Answer, and the second request comprises a Home Agent Request, each of the AA-Mobile-Node-Request, AA-Mobile-Node-Answer, and Home Agent Request being according to a Diameter Base Protocol.

17. A server associated with a foreign network comprising:

an interface adapted to communicate with a home server associated with a home network of a visiting mobile node in the foreign network; and a controller adapted to receive a first request indicating the visiting mobile node seeks to discover a home agent, the first request containing registration information of the mobile node, the controller adapted to send a second request to the home server and receive an answer from the home server responsive to the second request, the controller adapted to send a home agent request message to a node in the foreign network to assign the node in the foreign network as the home agent for the mobile node, wherein the second request comprises an AA-Mobile-Node-Request according to a Diameter Base Protocol, and the answer comprises an AA-Mobile-Node-Answer according to the Diameter Base Protocol, the answer containing a Result-Code field set to a predefined value to indicate that assignment of the home agent is to be performed in the foreign network.

18. The server of claim 17, wherein the controller is adapted to perform tasks defined by Mobile Internet Protocol Authentication, Authorization, and Accounting (AAA) requirements.

19. The server of claim 18, comprising a foreign AAA server.

20. The server of claim 17, wherein the first request contains an address of the home agent set to a predefined invalid value.

* * * * *